United States Patent
Holm et al.

(10) Patent No.: US 9,712,425 B2
(45) Date of Patent: Jul. 18, 2017

(54) MAINTAINING OPTIMAL MEDIA ROUTING

(71) Applicant: TELEFONAKTIEBOLAGET L M ERICSSON (PUBL), Stockholm (SE)

(72) Inventors: Jan Holm, Stora Skedvi (SE); Gert Öster, Järfälla (SE); Christer Holmberg, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 59 days.

(21) Appl. No.: 14/426,916

(22) PCT Filed: Mar. 5, 2015

(86) PCT No.: PCT/EP2015/054677
§ 371 (c)(1),
(2) Date: Mar. 9, 2015

(87) PCT Pub. No.: WO2015/176835
PCT Pub. Date: Nov. 26, 2015

(65) Prior Publication Data
US 2016/0156544 A1    Jun. 2, 2016

Related U.S. Application Data

(60) Provisional application No. 62/002,208, filed on May 23, 2014.

(51) Int. Cl.
*H04L 12/721* (2013.01)
*H04L 29/06* (2006.01)
*H04L 12/715* (2013.01)
*H04L 12/751* (2013.01)

(52) U.S. Cl.
CPC .............. *H04L 45/12* (2013.01); *H04L 45/02* (2013.01); *H04L 45/04* (2013.01); *H04L 65/103* (2013.01);
(Continued)

(58) Field of Classification Search
None
See application file for complete search history.

(56) References Cited

U.S. PATENT DOCUMENTS

| 9,392,436 B2 * | 7/2016 | Xu ........................... H04W 8/06 |
| 2007/0133517 A1 * | 6/2007 | Miller ................. H04L 65/1069 370/352 |

(Continued)

FOREIGN PATENT DOCUMENTS

| WO | 2013064397 A1 | 5/2013 |
| WO | 2013174440 A1 | 11/2013 |

OTHER PUBLICATIONS

3GPP TR 23.850 V11.0.0; 3rd Generation Partnership Project; Technical Specification Group Services and System Aspects; Study on roaming architecture for voice over IP Multimedia Subsystem (IMS) with local breakout (Release 11); Dec. 2011.
(Continued)

*Primary Examiner* — Ayaz Sheikh
*Assistant Examiner* — Tarell Hampton

(57) ABSTRACT

A method of managing a media path for a media session established between users across a plurality of interconnected Internet Protocol (IP) networks which utilize Session Initiation Protocol (SIP) and Session Description Protocol (SDP) signaling. The method comprises, at session establishment via a signaling path over the IP networks, making a determination that a shortcut media path is available, wherein the shortcut media path deviates from the signaling path. The method further comprises making a further determination that nodes in the signaling path will subsequently be able to maintain the shortcut media path in the event of a subsequent session update or re-invite and, at a subsequent session update or re-invite, including within update or re-invite signaling an indication that the shortcut media path is to be maintained.

15 Claims, 7 Drawing Sheets

(52) U.S. Cl.
CPC ...... *H04L 65/1006* (2013.01); *H04L 65/1016* (2013.01); *H04L 65/1083* (2013.01)

(56) References Cited

U.S. PATENT DOCUMENTS

| | | | |
|---|---|---|---|
| 2010/0211686 A1* | 8/2010 | Poikselka | H04L 65/1069 709/227 |
| 2012/0177193 A1* | 7/2012 | Keller | H04W 76/02 379/211.01 |
| 2015/0043429 A1* | 2/2015 | Kim | H04W 4/008 370/328 |

OTHER PUBLICATIONS

3GPP TS 29.079 V11.2.0, 3rd Generation Partnership Project; Technical Specification Group Core Network and Terminals; Optimal media routeing within the IP Multimeda Subsystem (IMS); Stage 3 (Release 11) (Dec. 2012).

3GPP TS 24.229 V10.6.1, 3rd Generation Partnership Project; Technical Specification Group Core Network and Terminals; IP multimedia call control protocol based on Session Initiation Protocol (SIP) and Session Description Protocol (SDP); Stage 3 (Release 10) (Jan. 2012).

3GPP TS 24.228 V1.1.0, 3rd Generation Partnership Project; Technical Specification Group Core Network; Signalling flows for the IP multimedia call control based on SIP and SDP (Release 5) (Jun. 2001).

GSM Association, Official Document IR.65, IMS Roaming & Interworking Guidelines, Version 8.0, May 9, 2012.

Rosenberg, et al., IETF, Network Working Group, Request for Comments: RFC3261, "SIP: Session Initiation Protocol," Jun. 2002.

Handley, et al., IETF, Network Working Group, Request for Comments: RFC4566, "SDP: Session Description Protocol," Jul. 2006.

* cited by examiner

MAINTAINING OPTIMAL MEDIA ROUTING

This application is a 371 of international application PCT/EP2015/054677, filed Mar. 5, 2015, which claims the benefit of U.S. Provisional Application No. 62/002,208, filed May 23, 2014, the disclosures of which are fully incorporated herein by reference.

TECHNICAL FIELD

The present invention relates to optimal media routing in a 3GPP network and, more particularly, to the maintenance of an optimal media routing shortcut for the duration of a media session.

BACKGROUND

IP Multimedia Subsystem (IMS) is an architecture defined by the 3$^{rd}$ Generation Partnership Project (3GPP) for the delivery of IP Multimedia services. In particular, 3GPP TS 24.229 defines a call control protocol for use in the IP Multimedia Core Network subsystem based on the Session Initiation Protocol (SIP) and the associated Session Description Protocol (SDP). A special case of establishing a call is defined in the roaming architecture for voice over IMS with "local breakout" as specified in 3GPP TS 23.228. The reason for introducing the roaming architecture for voice over IMS with local breakout is to mimic the existing charging model for a roaming user in the traditional circuit switched (CS) network. In particular, when a User Equipment (UE-A) is roaming in a Visited Public Mobile Network (VPMN-A), and VPMN call routing is applied for Voice over Long Term Evolution (VoLTE) roaming, the call signalling path from VPMN-A via UE-A's Home Public Mobile Network (HPMN-A) back to VPMN-A will not "carry" any end-to-end media (i.e. the so-called "tromboning" of media is avoided), and is expected to be charged as signaling.

FIG. 1 illustrates the roaming architecture for voice over IMS with local breakout, where the entities designated IMS-ALG represent back-to-back user agents (UAs). The entities designated P-CSCF and S-CSCF represent the Proxy and Serving IMS Call Session Control Functions respectively, whilst the entity designated TRF represents the Transit and Roaming Function. In the Figure, the solid line extending between user A and a second roaming user B represents the media path, whilst the broken line represents the call control signalling path. [Between the visited network A, home network B and the visited network B, the call control signalling path and the media path is the same and is outside the scope of this discussion.]

The call control signalling path is established using SIP as defined in IETF RFC 3261 (and extensions to RFC 3261) and 3GPP TS 24.229. The media path is established using IETF RFC 4566 (and extensions to RFC 4566), 3GPP TS 24.229 and 3GPP TS 29.079. 3GPP TS 29.079 defines optimal media routing (OMR). OMR is a flexible mechanism to bypass all intermediate networks and connect media end-to-end thus bypassing intermediate networks outside the end points IP address space (realm).

The charging model for roaming users is applied as follows:
 a) When a user is roaming and attached to another operator network (the visited network A in FIG. 1), dialog creating and stand-alone SIP requests are sent via the home network A.
 b) The home network A executes services (e.g. privacy services and the barring service) and, if the SIP request is an INVITE request, the home network A sends the SIP request back to the visited network A.
 The visited network A routes the SIP request towards the destination (referred to as "Home Network B" in FIG. 1).
 [Although in FIG. 1 the destination is within another visited network, it may be with VPLMN-A or in the CS network.]
 c) During the process of sending the SIP request via the home network A and back to the visited network A, the use of OMR makes it possible to keep the media within the visited network A.

The current session establishment procedure, including OMR, is illustrated in FIG. 2, and the general principles are as follows:

1-3. A SIP user agent (UA) sends an initial SDP offer (e.g. in an initial SIP INVITE request). The SIP request is forwarded hop-by-hop, passing one or more IMS-ALG entities. Each IMS-ALG can, according to a local policy, determine whether it can be bypassed by media or not. If it can be bypassed, it will add the identity and realm of the preceding node (UA or IMS-ALG) into the "visited-realm" and, if an alternative connection alternative exists, "secondary-realm" SDP attributes [the Figure only shows the "visited-realm" attributes assuming that there are no alternative connections] as specified in 3GPP TS 29.079. [Any nodes in networks between the visited network A and home network A can also apply the OMR procedures if allowed by their local policies. However, for simplicity, nodes in intermediate networks are not considered here.]
 As the message travels along the signalling path, a chain is constructed in the SDP attributes identifying nodes (and their realms) that precede nodes that can be bypassed.

4. When the SDP offer arrives at an IMS-ALG, and that IMS-ALG detects that it is in the same realm as one of the earlier nodes identified in the SDP attributes, a shortcut is identified [in this case the bottommost "visited-realm" IP realm in the Initial SDP offer is the same as the IP realm where the UA-B is connected], with the current node handling the offer representing one end of the short cut and the earlier node representing the other end. The IMS-ALG removes from the SDP attributes the identities of any intermediate nodes, i.e. those nodes between the two ends of the shortcut, and forwards the SDP offer towards the next hop using the SDP parameters of the node (e.g. the UA initiating the SDP offer).

3. When the UA-B receives the SDP, it returns an SDP answer. This is passed hop-by-hop towards UE-A. As long as a node handling the answer is not an end of a shortcut, the SDP answer is sent unmodified. However, as soon as the SDP arrives at a first end of a shortcut, the receiving node [in the Figure, IMS-ALG-3] modifies the SDP to include a null IP address (e.g. 0.0.0.0 in IPv4). The SDP answer from UA-B is kept in a "visited-realm" OMR SDP attribute in the SDP answer. The null IP address is kept as long as the SDP answer is passing other nodes between the shortcut ends.

4. When the SDP answer is received by the node at the other end of the shortcut (IMS-ALG-1), that node recognizes that it is indeed a shortcut end since the realm on the outgoing side is the same as the "visited-realm" received in the SDP answer. The node recovers the SDP from the OMR attributes and sends the SDP answer with original IP address towards UA-A. The media is now travelling from UA-A to UA-B without any involvement of intermediate IMS-ALGs.

The use of OMR to avoid media being tromboned via the HPMN-A has some side effects. In particular, IPX "Hubbing" providers do not know whether or not they will be required to carry media until the B-Party answers, and thus may need to reserve media resources in the meantime. Mid-call events (Hold/Resume, SRVCC, Codec change, etc) require temporary (transient) allocation of IP resources along "signalling loop". This is illustrated in FIG. 3.

A further problem with the existing OMR solution is that, if any of the involved UAs (UA-A or UE-B) decides to send an updated SDP offer, the OMR procedure in step 1 to 4 is repeated, regardless of which UA sends the updated SDP offer. [An updated SDP offer can be sent when the initial SDP offer (or the SDP answer to the initial SDP offer) has indicated that the media resources have not been granted and cannot be used yet. The updated SDP offer indicates that the media resources are granted and can now be used.] If steps 1 to 4 are repeated, any one of the IMS-ALGs in the path can decide that they should no longer be bypassed, and that they should anchor the media. If this occurs, the media no longer traverses only the visited network. Of course, due to current charging models this situation cannot be tolerated. In any case, the repetition of steps 1 to 4 would increase the signaling load (there is signalling between an IMS-ALG and its media gateway to reserve resources that will never be used) and temporarily block network resources in the IMS-ALG's media gateways.

SUMMARY

According to a first aspect of the present invention there is provided a method of managing a media path for a media session established between users across a plurality of interconnected IP networks which utilize Session Initiation Protocol, SIP, and Session Description Protocol, SDP, signaling. The method comprises, at session establishment via a signaling path over said IP networks, making a determination that a shortcut media path is available, wherein the shortcut media path deviates from said signaling path. The method further comprises making a further determination that nodes in the signaling path will subsequently be able to maintain the shortcut media path in the event of a subsequent session update or re-invite and, at a subsequent session update or re-invite, including within update or re-invite signaling an indication that the shortcut media path is to be maintained.

As a result of the inclusion within update or re-invite signaling of an indication that the shortcut media path is to be maintained, nodes in the signaling path need not unnecessarily reserve IP, e.g. media, resources that will not subsequently be required.

Furthermore, changes in the media path may be avoided. It will be appreciated that it is as a result of the making of the further determination that said indication can be included within the update or re-invite signaling. In the absence of any such determination, no such indication may be included.

The step of making a further determination that nodes in the signaling path will subsequently be able to maintain the shortcut media in the event of a subsequent session update or re-invite may comprise at, each node, e.g. back-to-back User Agent (IMS-ALG), in the signaling path, including in a session establishment signaling message, e.g. SIP INVITE or response, an indication that the node supports maintenance of a shortcut media path. Upon receipt of the session establishment signaling message at a signaling node originating or terminating the shortcut media path, or rather originating or terminating the OMR procedure, that originating or terminating signaling node is able determine that all nodes in the signaling path support maintenance of a shortcut media path. Typically, both the originating and terminating signaling nodes make this determination.

An indication that the shortcut media path is to be maintained may be included within the update or re-invite signaling, e.g. a SIP re-INVITE or SIP UPDATE message, by including a pre-defined parameter in the SDP part or as a SIP message parameter.

According to a second aspect of the present invention there is provided a method carried out at a signaling node responsible for managing a media path for a media session established between users across a plurality of interconnected IP networks which utilize Session Initiation, SIP, and Session Description Protocol, SDP, signaling. The method comprises, for a session initiation request traversing a signaling path across said IP networks, initiating an Optimal Media Routing, OMR, procedure and inserting into the request an indication that the signaling node will subsequently be able to maintain any shortcut media path that deviates from a signaling path. The method further comprises receiving a session initiation request response including an indication that all nodes in the signaling path will subsequently be able to maintain any shortcut media path that deviates from a signaling path, and, for a subsequent session update or re-invite, including within update or re-invite signaling an indication that the shortcut media path is to be maintained.

According to a third aspect of the present invention there is provided a method carried out at a signaling node responsible for managing a media path for a media session established between users across a plurality of interconnected IP networks which utilize Session Initiation, SIP, and Session Description Protocol, SDP, signaling. The method comprises, for a session initiation request traversing a signaling path across said IP networks, terminating an Optimal Media Routing, OMR, procedure and determining from the contents of the session initiation request that downstream nodes in the signaling path will subsequently be able to maintain any shortcut media path that deviates from a signaling path. The method further comprises, for a subsequent session update or re-invite, including within update or re-invite signaling an indication that the shortcut media path is to be maintained.

According to a fourth aspect of the present invention there is provided a method carried out at a signaling node responsible for managing a media path for a media session established between users across a plurality of interconnected IP networks which utilize Session Initiation, SIP, and Session Description Protocol, SDP, signaling. The method comprises, for a session initiation request traversing a signaling path across said IP networks, inserting into the request an indication that the signaling node will subsequently be able to maintain any shortcut media path that deviates from a signaling path. The method further comprises, for a subsequent session update or re-invite, determining from the contents of the session update or re-invite that the pre-existing shortcut media path is to be maintained.

Further aspects of the present invention are set out in the appended claims.

DETAILED DESCRIPTION

The following specifications are relevant to this description:
3GPP TS 29.079; Optimal media routing within the IP Multimedia Subsystem (IMS); Stage 3
3GPP TS 24.229; IP multimedia call control protocol based on Session Initiation Protocol (SIP) and Session Description Protocol (SDP); Stage 3
3GPP TS 24.228; IP Multimedia Subsystem (IMS); Stage 2
IR.65; IMS Roaming and Interworking Guidelines
IETF RFC 3261; Session Initiation Protocol
IETF RFC 4566; Session Description Protocol Certain problems associated with implementing OMR in its current form have been discussed above. It is proposed here to overcome these problems by allowing nodes (IMS-ALG) within a shortcut media path to identify—to other signaling nodes—that they are capable of subsequently maintaining the shortcut at a later event. These indications can be employed at that later event to force maintenance of the shortcut and stop or limit the possibility for an IMS-ALG to break an established shortcut. The general principles that are employed are as follows:

a An IMS-ALG that initiates the OMR procedure will include in the SDP offer an indication that the IMS-ALG supports keeping the shortcut during SDP offer/answer updates.

b An IMS-ALG that removes the OMR attributes and recovers the original SDP offer will include the same indication in SIP responses to the INVITE requests, re-INVITE request and UPDATE requests.

If support to keep the shortcut indicator is successfully exchanged, the IMS-ALGs will:

1. Include the IP address that was negotiated in any SDP offer from the previous node while sending the SDP offer outside its own realm and include the received IP address in an OMR attribute (the visited-realm attribute is a good alternative to use for this purpose); or 2. Reject any attempt from the previous node that would require a full SDP offer/answer procedure.

If support to keep the shortcut indicator is not successfully exchanged, the IMS-ALGs will apply the existing procedures in 3GPP TS 29.079 for SDP updates.

If any node in the signalling path updates the SDP with new codecs, new IP address etc, the last IMS-ALG (i.e. the one that interfaces the UA) will reject the updated SDP offer.

This approach uses the IP address that was negotiated when the shortcut was established, together with an indicator indicating that maintenance of the shortcut is supported by nodes along the signalling path. The indicator could be a feature-capability indicator in the Feature-Caps header field, or an indication in the SDP as the "keep shortcut" indication. The IP address could either be the real IP address all the way or the real IP address and an invalid IP addresses when an SDP offer passes areas where the real IP address is not valid. Any combination of the handling of the IP address and the "keep shortcut" indication is possible.

Solution Using a Feature-Capability Indicator as the "Keep Shortcut" Indication

Figure 1:
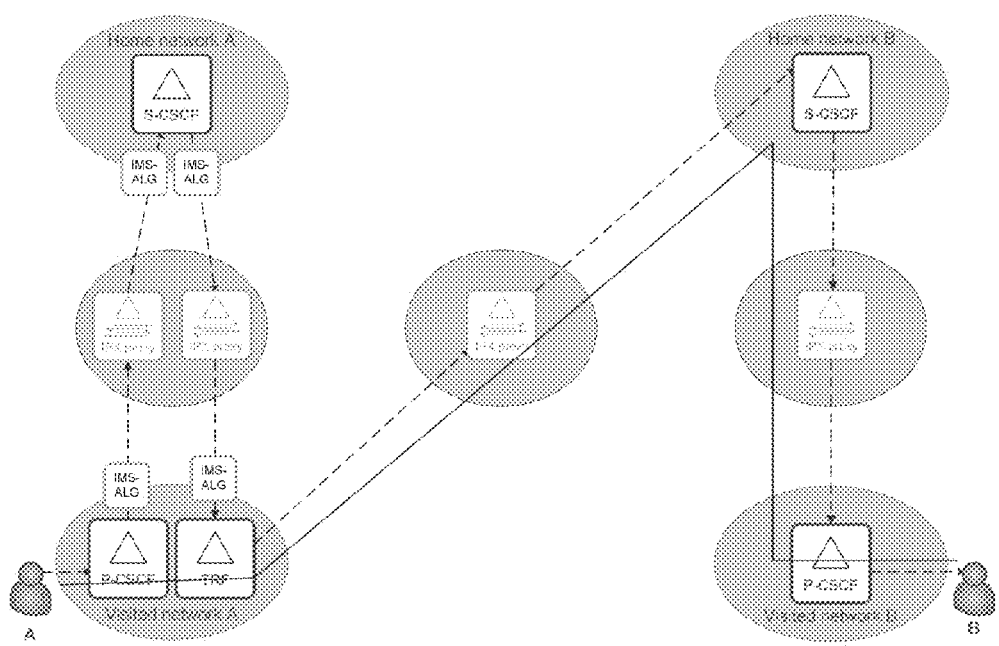
FIG. 1 illustrates schematically a roaming architecture for voice over IMS with local breakout.
Figure 2:
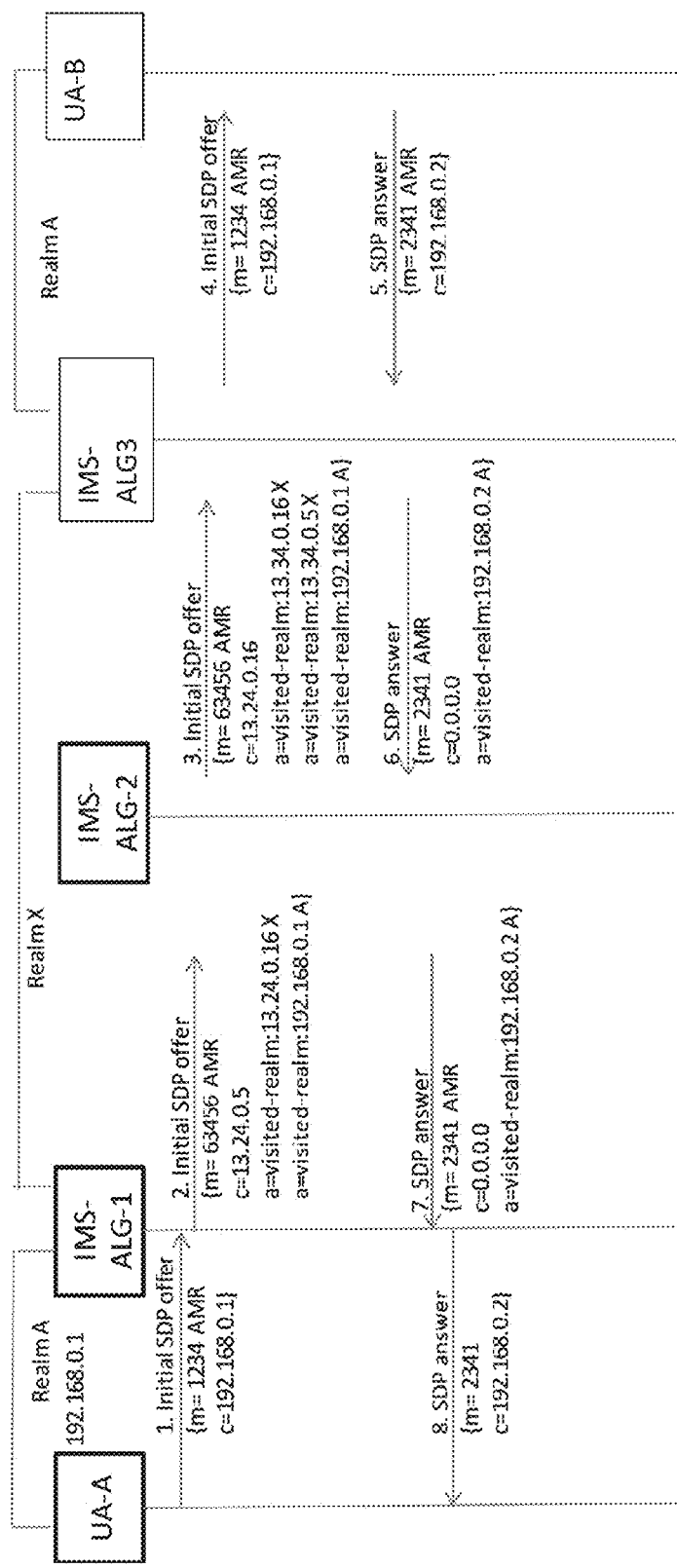
FIG. 2 illustrates a prior art session establishment procedure over IMS including OMR.
Figure 3:
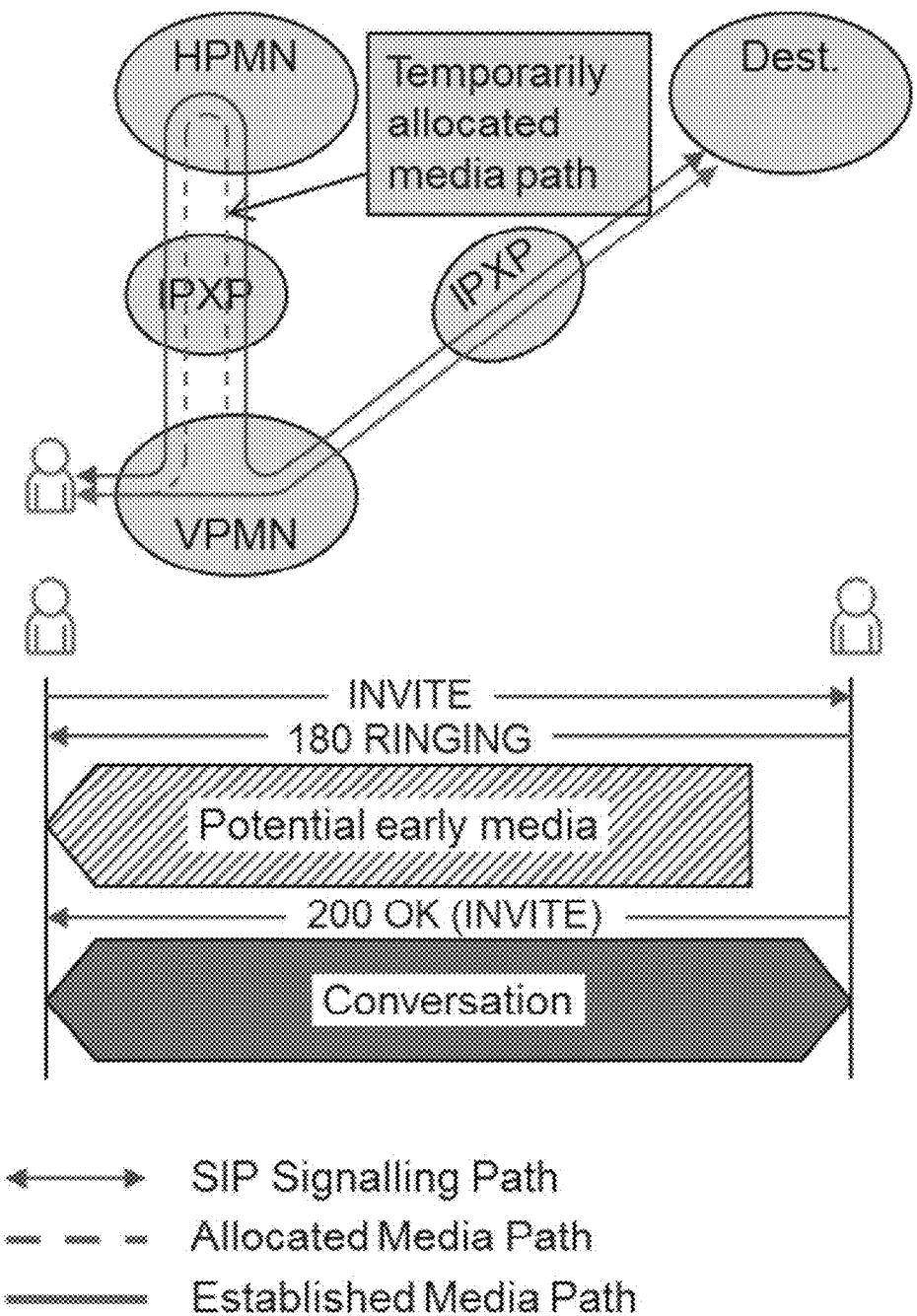
FIG. 3 illustrates schematically a potential problem with the prior art OMR procedure for session establishment, involving temporary allocation of media resources.
Figure 4:
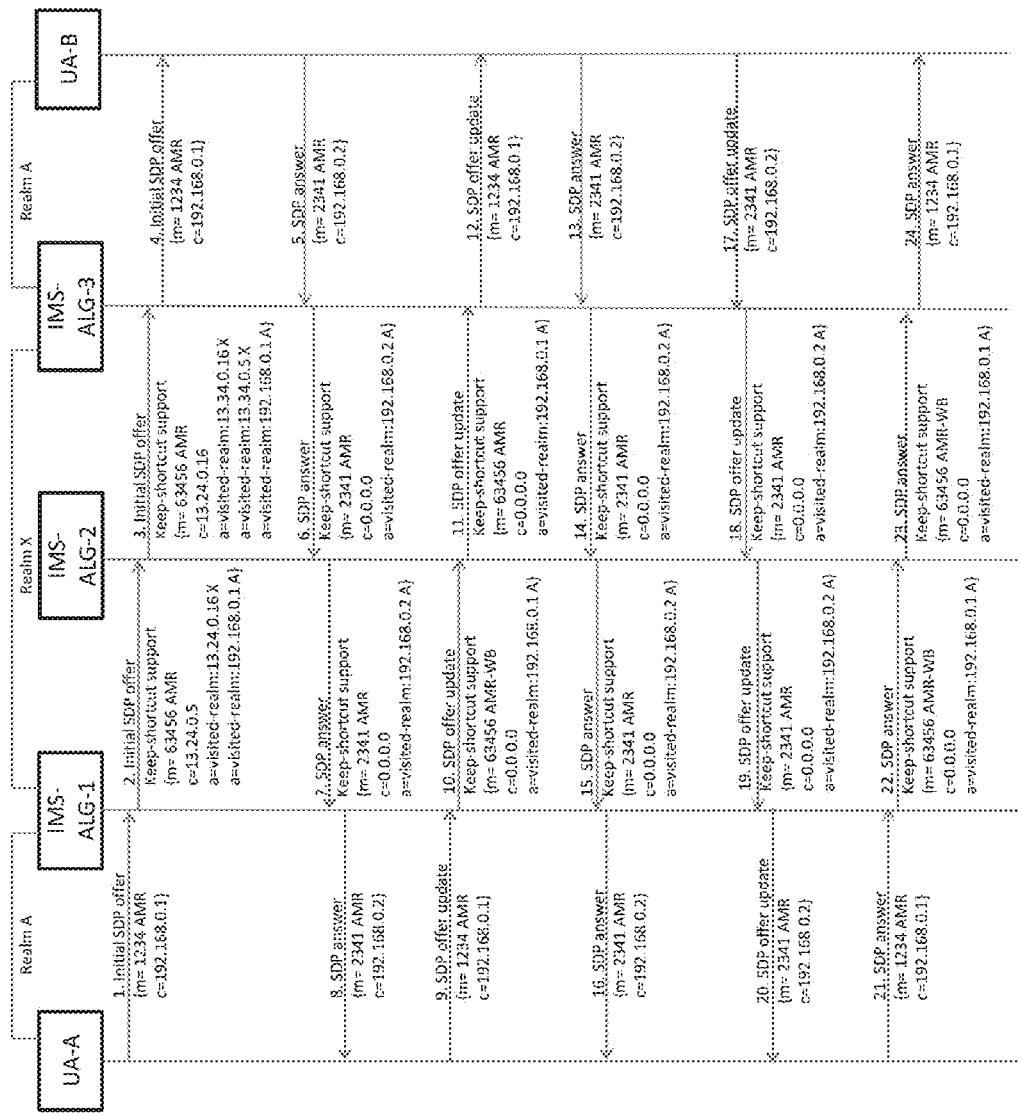
FIG. 4 illustrates a general procedure for maintaining a media shortcut for new media.

This solution uses the feature-capability indicator as the "keep shortcut" indication and the real IP address and an invalid IP addresses when an SDP offer passes areas where the real IP address is not valid. Backward compatibility is achieved by means of bilateral agreements such that, if a node knows that the next hop supports the keep shortcut procedures, the feature-capability indicator is kept (or inserted if it is the first node). FIG. 4 illustrates the general principle as to how a media shortcut can be maintained in the context of 3GPP TS 24.079. NB. For simplicity, the message flow focuses only on the OMR specific parameters and the "keep-shortcut" indication. The steps of the flow are as follows:

1. The UA-A sends an initial SDP offer (most likely in an initial INVITE request). The SDP includes the real IP address 192.168.0.1. The IP address is valid only within the realm A.

2. The IMS-ALG-1 reserves resources in its own media gateway and modifies the SDP offer by adding the media gateway's IP address 13.24.0.16. The IP address is valid only within the realm X. Following the OMR procedure in 3GPP TS 24.079, the IMS-ALG-1 adds the visited-realm attributes of the UA-A and the media gateway. The IMS-ALG-1 adds a keep-shortcut indicator in a feature-indicator in the Feature-Caps header field indicating that the IMS-ALG-1 supports keeping the shortcut even when the SDP is updated.

3. The IMS-ALG-2 reserves resources in its own media gateway and modifies the SDP offer with the media gateway's IP address 13.24.0.5. The IP address is valid only within the realm X. Following the OMR procedure in 3GPP TS 24.079, the IMS-ALG-2 adds the visited-realm attributes of the media gateway.

4. The IMS-ALG-3 inspects the OMR attributes in the SDP and detects that the realm on the outgoing side is the same as the bottommost realm among the OMR attributes, namely Realm A. The IMS-ALG-3, by local policy, detects that the next hop is an OMR unaware node and removes the OMR attributes whilst retaining the original IP addresses of UA-A in the SDP before sending the SDP offer towards the UA-B. The keep-shortcut feature-indicator is removed.

5. The UA-B accepts a proposed Adaptive Multi-Rate (AMR) codec and returns an SDP answer. The SDP answer includes the real IP address 192.168.0.2. The IP address is valid only within the realm A.

6. When the IMS-ALG-3 receives the SDP answer, and since the IP address is only valid within realm A, the B2UBUA-3 replaces the IP address in SDP with the IPv4 address 0.0.0.0 and includes the real IP address in the OMR attribute visited-realm. The IMS-ALG-3 adds a keep-shortcut indicator (e.g. in a feature-indicator in the Feature-Caps header field), indicating that the IMS-ALG-1 supports keeping the shortcut even when the SDP is updated. The SDP answer is sent to the IMS-ALG-2.

7. When the IMS-ALG-2 receives the SDP answer, the IMS-ALG-2 releases its resources in the media gateway and sends the SDP answer to the IMS-ALG-1.

8. When the IMS-ALG-1 detects that the realm in the OMR attribute visited-realm is the same as the realm on the incoming side of the media gateway, it releases the local media gateway resources and replaces the 0.0.0.0 IP address with the IP address in the OMR attribute visited-realm. The keep-shortcut feature-indicator is removed.
9. When resources in the access network are granted, the UA-A sends an updated SDP offer.
10. Since the keep-shortcut feature-capability indicator was received in the SDP answer, the IMS-ALG-1 replaces the real IP address in the SDP offer with the 0.0.0.0 IP address, adds the real IP address in the OMR attribute visited-realm, includes a keep-shortcut indicator and sends the updated SDP offer to the IMS-ALG-2.
   NOTE 2: If the remote IMS-ALG-3 did not return the keep-shortcut feature-capability indicator, the IMS-ALG-1 follows the procedures in step 2 above.
11. Since the 0.0.0.0 IP address is included in the updated SDP offer, the IMS-ALG-2 forwards the updated SDP offer without further action.
    NOTE 3: If the IMS-ALG-1 did not include the 0.0.0.0 IP address in the SDP offer the IMS-ALG-2 would have followed the same procedure as in step 3 (i.e. reserved media resources, etc.). Now this is not needed any longer.
12. The IMS-ALG-3 recognises that the outgoing side realm is the same as the visited realm in the OMR attributes, and hence replaces the 0.0.0.0 IP address with the IP address in the OMR attribute visited-realm and sends the updated SDP offer to the UA-B.
13. The UA-B sends an SDP answer with the real IP address to the IMS-ALG-3.
14. IMS-ALG-3 recognises that the next step is outside the IP realm and therefore that the IP address is not valid. It therefore replaces the real IP address with the 0.0.0.0 IP address and includes the real IP address in the OMR attribute visited-realm and sends the SDP answer to the IMS-ALG-2.
15. IMS-ALG-2 sends the SDP answer to the IMS-ALG-1.
16. IMS-ALG-1 recognises that the outgoing side realm is the same as the visited realm in the OMR attribute and hence replaces the 0.0.0.0 IP address with the IP address in the visited-realm, removes the OMR attributes and sends the SDP answer to the UA-A.
17-24. When resources in the access network are granted, UA-B sends an updated SDP offer towards the IMS-ALG-3. The procedures follows the same principles as in steps 9-16 but in the opposite direction.

Solution Using an Indication in the SDP as the "Keep Shortcut" Indication

This solution uses an attribute in SDP as the "keep shortcut" indication, and SDP offers after the initial SDP offer/answer will contain the real IP address all the way along the path. Backward compatibility is achieved by adding an indication, e.g. "KS", at the end of the visited-realm attribute. If all involved nodes support the keep shortcut procedures, each visited realm in the SDP will contain the "KS" indication and the nodes that create the shortcut will know that the keep shortcut procedures can be used.

Figure 5:
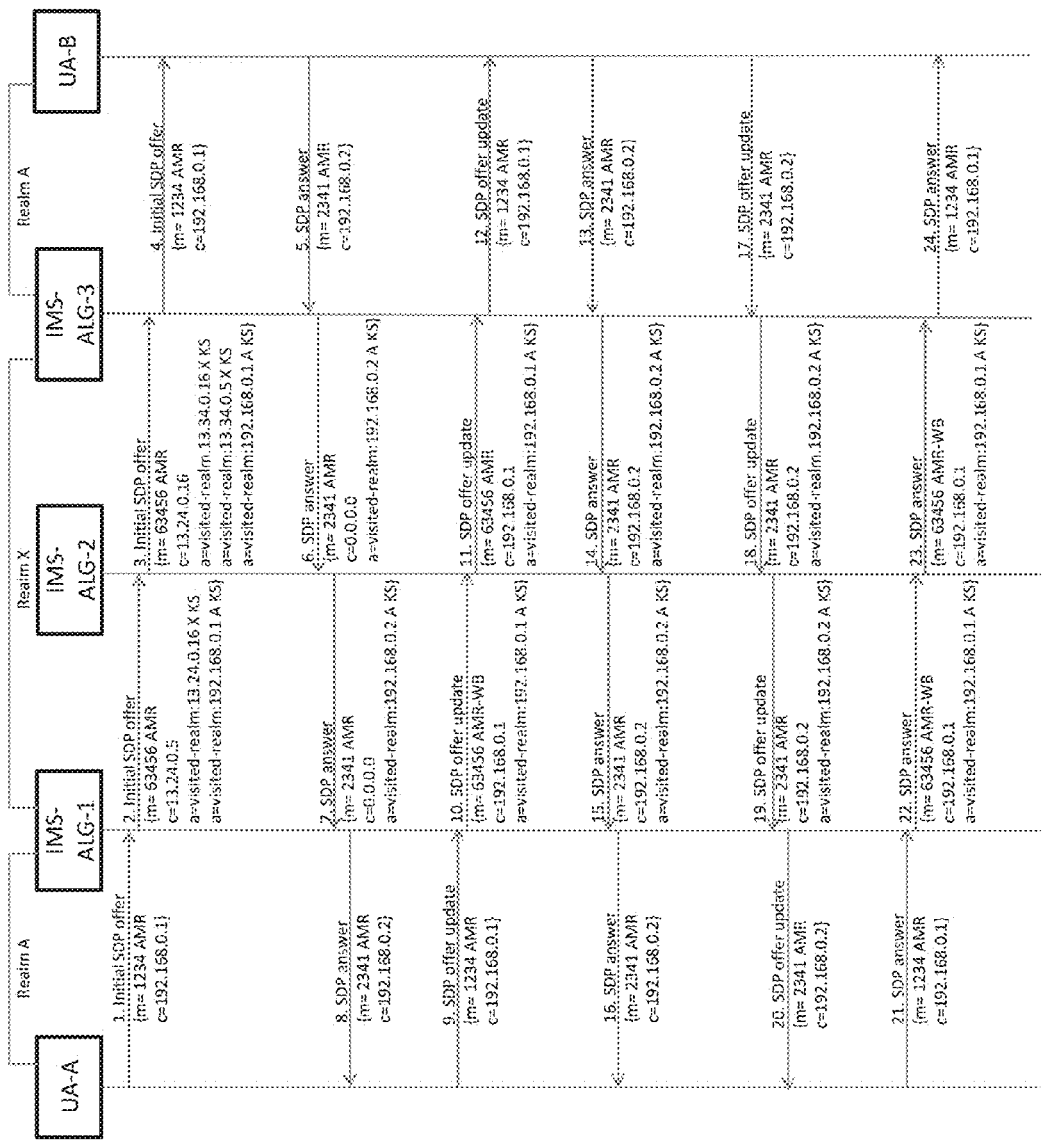
FIG. 5 illustrates an alternative procedure for maintaining a media shortcut for new media.

FIG. 5 illustrates this OMR procedure, where the message flow is simplified and focuses on protocol elements of interest for the keep shortcut feature. The procedure is as follows:

1. The UA-A sends an initial SDP offer (most likely in an initial INVITE request). The SDP includes the real IP address 192.168.0.1. The IP address is valid only within the realm A.
2. The IMS-ALG-1 reserves resources in its own media gateway and modifies the SDP offer with the media gateway's IP address 13.24.0.16. The IP address is valid only within the realm X. Following the OMR procedure in 3GPP TS 24.079, the IMS-ALG-1 adds the visited-realm attributes of the UA-A and the media gateway and a "KS" indication at the end of the visited-realm attributes, indicating that the IMS-ALG-1 supports keeping the shortcut when the SDP is updated.
3. The IMS-ALG-2 reserves resources in its own media gateway and modifies the SDP offer with the media gateway's IP address 13.24.0.5. The IP address is valid only within the realm X. Following the OMR procedure in 3GPP TS 24.079, the IMS-ALG-2 adds the visited-realm attributes of the media gateway and a "KS" indication at the end of the visited-realm attribute indicating that the IMS-ALG-2 supports keeping the shortcut when the SDP is updated.
4. The IMS-ALG-3 inspects the OMR attributes in SDP and detects that the realm on the outgoing side is the same as the bottommost realm among the OMR attributes. The IMS-ALG-3, by local policy, detects that the next hop is an OMR unaware node and removes the OMR attributes and recovers the original IP addresses of UA-A in the SDP before sending the SDP offer towards the UA-B.
   NOTE: When removing the OMR attributes from the SDP, the IMS-ALG-3 checks if all involved IMS-ALGs support keeping the shortcut by looking for the "KS" indication at the end of all the visited-realm attributes. In this example all involved IMS-ALGs do indeed support keeping the shortcut.
5. The UA-B accepts the proposed AMR codec and returns an SDP answer. The SDP answer includes the real IP address 192.168.0.2. The IP address is valid only within the realm A.
6. When the IMS-ALG-3 receives the SDP answer, and since the IP address is only valid within realm A, the B2UBUA-3 replaces the IP address in SDP with the IPv4 address 0.0.0.0 and includes the real IP address in the OMR attribute visited-realm before sending the SDP answer to the IMS-ALG-2. Since all involved nodes supports the keep shortcut procedure, the "KS" indication is added at the end of the visited-realm attribute.
7. When the IMS-ALG-2 receives the SDP offer, the IMS-ALG-2 releases its resources in the media gateway and sends the SDP answer to the IMS-ALG-1.
8. When the IMS-ALG-1 detects that the realm in the OMR attribute visited-realm is the same as the realm on the incoming side of the media gateway, the IMS-ALG-1, releases the media gateway resources and replaces the 0.0.0.0 IP address with the IP address in the OMR attribute visited-realm. The IMS-ALG-1 detects that the "KS" indication is included at the end of the visited-realm attribute and concludes that the keep shortcut procedures can be used.
9. When resources in the access network are granted, the UA-A sends an updated SDP offer.
10. Since the keep shortcut procedure is supported by all the involved nodes, the IMS-ALG-1 keeps the real IP address in the SDP offer and adds the OMR attribute visited-realm with the "KS" indication, and sends the updated SDP offer to the IMS-ALG-2.

NOTE: If all the IMS-ALGs do not support the keep shortcut procedures, the IMS-ALG-1 would have followed normal OMR procedures as described in 3GPP TS 29.079.

11. Since the keep shortcut procedure is used, the IMS-ALG-2 forwards the updated SDP offer to the IMS-ALG-3 without further actions.

12. Since the keep shortcut procedure is used, the IMS-ALG-3 removes the visited-realm attribute and forwards the updated SDP offer to UE-B without further actions.

13. The UA-B sends an SDP answer with the real IP address to the IMS-ALG-3.

14. Since the keep shortcut procedure is used, the IMS-ALG-3 adds the visited-realm attribute with the "KS" indication and forwards the SDP answer to IMS-ALG-2 without further actions.

15. Since the keep shortcut procedure is used, IMS-ALG-2 forwards the SDP answer to IMS-ALG-1 without any further actions.

16. Since the keep shortcut procedure is used, the IMS-ALG-1 removes the visited-realm attribute and forwards the SDP answer without further action.

17-24. When resources in the access network are granted, UA-B sends an updated SDP offer towards the IMS-ALG-3. The procedures follow the same principles as in steps 9-16 but in the opposite direction.

Adding Media to a Session where a Shortcut Exists

The approach presented here uses an attribute in SDP as the "keep shortcut" indication, and SDP offers after the initial SDP offer/answer will contain the real IP address all the way along the signaling path. It is assumed now that an active session involving audio (using AMR codec) exists between a UE-A and a UE-B, and that during establishment of the session a media shortcut was created using OMR. As a result, all of the involved IMS-ALG nodes have learned that they all support keeping the media shortcut.

Figure 6:
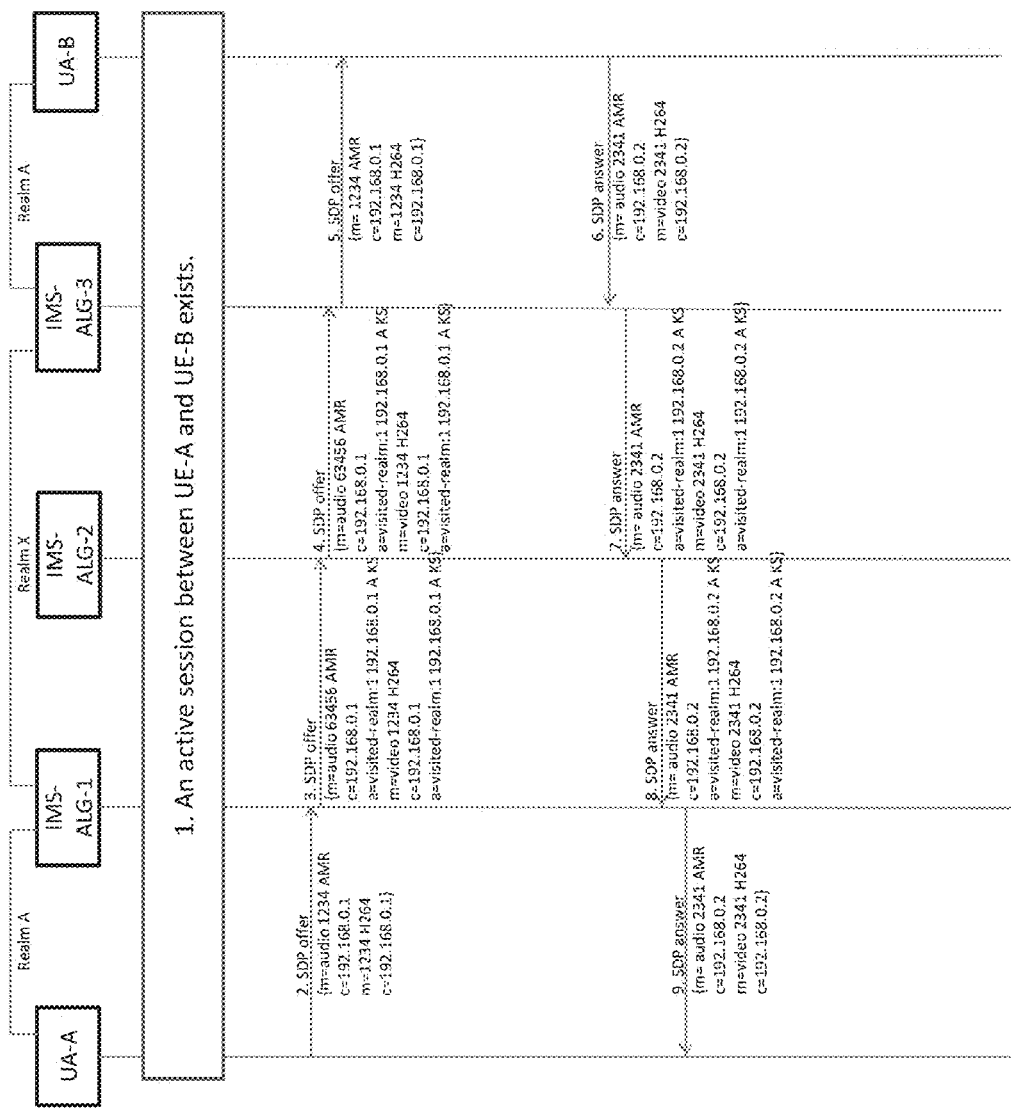
FIG. 6 illustrates a procedure for adding new media and which relies upon the procedure of FIG. 5.

With reference to FIG. 6, the following steps are identified:

1. A session with active media is established between UE-A and UE-B as described above. The user at UE-A decides to add video to the ongoing session.

2. The UE-A sends an SDP offer where the video codec h264 is added.

3. When the IMS-ALG-1 receives the offer, and since keep shortcut procedures are possible, the IMS-ALG-1 adds the visited-realm attribute with the "KS" indication to each media type and sends the SDP offer to the IMS-ALG-2.

4. When IMS-ALG-2 receives the SDP offer, and since keep shortcut procedures are used, the IMS-ALG-2 forwards the SDP offer to IMS-ALG-3 without any further actions.

5. When the IMS-ALG-3 receives the SDP offer, and since keep shortcut procedures are used, the IBCF removes the visited-realm attribute and forwards the SDP offer to the UE-B.

6-9. The UE-B accepts the addition of video and sends the SDP answer towards UE-A. The visited-realm attribute with the "KS" indication is added by IMS-ALG-3 and removed by IMS-ALG-1.

Figure 7:
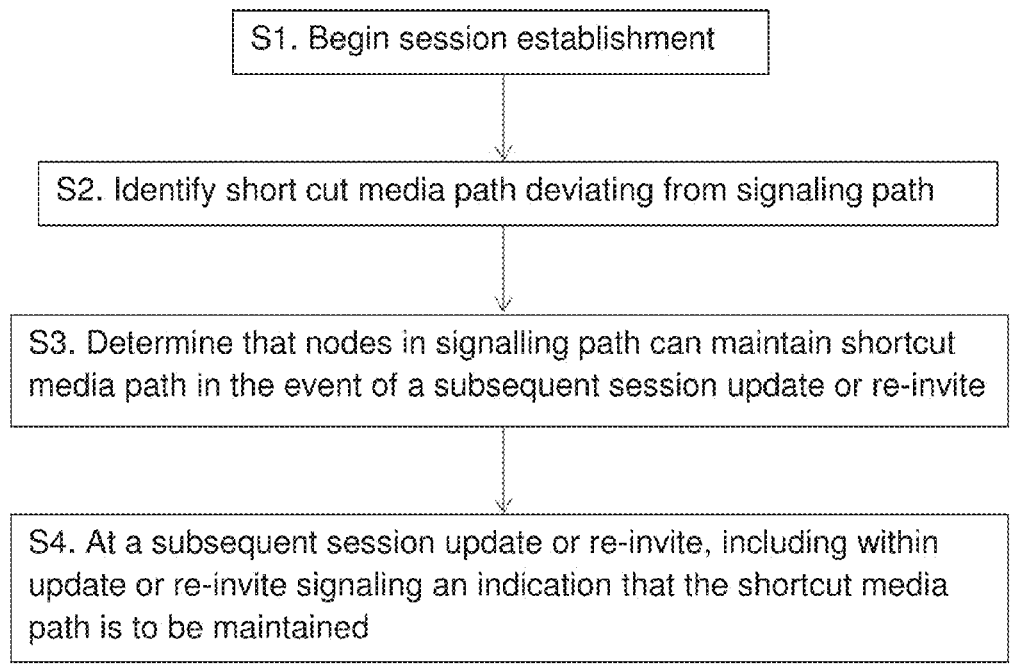
FIG. 7 is a flow diagram illustrating a general procedure for maintaining an OMR shortcut.
Figure 8:
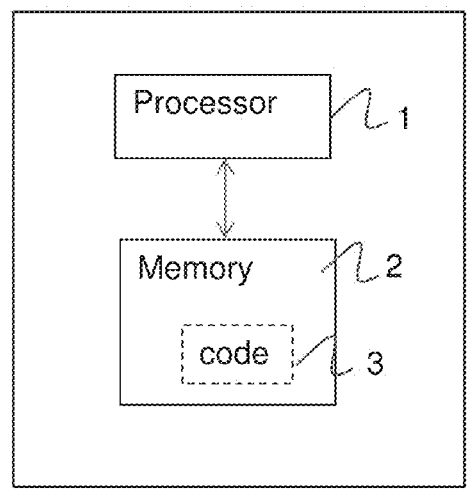
FIG. 8 illustrates schematically a node suitable for use in maintaining an OMR shortcut.

FIG. 7 is a flow diagram illustrating a series of steps associated with the "keep shortcut" procedure described above. FIG. 8 illustrates schematically a node that may be configured to operate as a not initiating OMR, terminating OMR, or operate as an intermediate node. The node comprises a processor 1, a memory 2, and program code 3 installed into the memory.

It will be appreciated by the person of skill in the art that various modifications may be made to the above described embodiments without departing from the scope of the present invention.

The invention claimed is:

1. A method of managing a media path for a media session established between users across a plurality of interconnected Internet Protocol (IP) networks which utilize Session Initiation Protocol (SIP) and Session Description Protocol (SDP) signaling, the method comprising:
   at session establishment via a signaling path over said IP networks, making a determination, at a signaling node, that a shortcut media path is available, wherein the shortcut media path deviates from said signaling path;
   making a further determination, by the signaling node, that each node in the signaling path will subsequently be able to maintain the shortcut media path in the event of a subsequent session update or re-invite; and
   at a subsequent session update or re-invite, the signaling node including within update or re-invite signaling an indication that the shortcut media path is to be maintained,
   wherein the step of making a further determination, by the signaling node, that nodes in the signaling path will subsequently be able to maintain the shortcut media in the event of a subsequent session update or re-invite further comprises at, each node in the signaling path, including in a session establishment signaling message an indication that the node supports maintenance of a shortcut media path.

2. The method according to claim 1, wherein, upon receipt of the session establishment signaling message at a signaling node originating or terminating an optimal media routing (OMR) procedure, determining that all nodes in the signaling path support maintenance of a shortcut media path.

3. The method according to claim 1, further comprising including within an SDP offer the feature-capability indicator as a keep shortcut indication.

4. The method according to claim 1, further comprising including a keep shortcut indication within the visited realm attributes of an SDP offer.

5. The method according to claim 1, wherein an indication that the shortcut media path is to be maintained is included within update or re-invite signaling by including a predefined parameter in the SDP part or as a SIP message parameter.

6. A method carried out at a signaling node responsible for managing a media path for a media session established between users across a plurality of interconnected Internet Protocol (IP) networks which utilize Session Initiation Protocol (SIP) and Session Description Protocol (SDP) signaling, the method comprising:
   for a session initiation request traversing a signaling path across said IP networks, initiating an Optimal Media Routing (OMR) procedure, by the signaling node, and inserting into the request an indication that the signaling node will subsequently be able to maintain any shortcut media path that deviates from a signaling path;
   receiving, by the signaling node, a session initiation request response including an indication that all nodes in the signaling path will subsequently be able to maintain any shortcut media path that deviates from a signaling path, wherein each node in the signaling path included, in a session initiation request signaling message, an indication that the node supports maintenance of a shortcut media path; and for a subsequent session update or re-invite, including within update or re-invite signaling, by the signaling node, an indication that the shortcut media path is to be maintained.

7. The method according to claim 6, further comprising including within an SDP offer the feature-capability indicator as a keep shortcut indication.

8. The method according to claim 6, further comprising including a keep shortcut indication within the visited realm attributes of an SDP offer.

9. A method carried out at a signaling node responsible for managing a media path for a media session established between users across a plurality of interconnected Internet Protocol (IP) networks which utilize Session Initiation Protocol (SIP) and Session Description Protocol (SDP) signaling, the method comprising:

for a session initiation request traversing a signaling path across said IP networks, terminating, by the signaling node, an Optimal Media Routing (OMR) procedure and determining from the contents of the session initiation request that downstream nodes in the signaling path will subsequently be able to maintain any shortcut media path that deviates from a signaling path, wherein each node in the signaling path included, in a session initiation request signaling message, an indication that the node supports maintenance of a shortcut media path; and for a subsequent session update or re-invite, including within the update or re-invite signaling an indication, by the signaling node, that the shortcut media path is to be maintained.

10. The method according to claim 9, wherein said step of determining from the contents of the session initiation request that downstream nodes in the signaling path will subsequently be able to maintain any shortcut media path that deviates from a signaling path, further comprises inspecting an SDP offer to identify a feature-capability indicator as a keep shortcut indication.

11. The method according to claim 9, wherein said step of determining from the contents of the session initiation request that downstream nodes in the signaling path will subsequently be able to maintain any shortcut media path that deviates from a signaling path, further comprises inspecting an SDP offer to identify a keep shortcut indication within the visited realm attributes of an SDP offer.

12. A method carried out at a signaling node responsible for managing a media path for a media session established between users across a plurality of interconnected Internet Protocol (IP) networks which utilize Session Initiation Protocol (SIP) and Session Description Protocol (SDP) signaling, the method comprising:

for a session initiation request traversing a signaling path across said IP networks, inserting into the request, by the signaling node, an indication that the signaling node will subsequently be able to maintain any shortcut media path that deviates from a signaling path, wherein each node in the signaling path included, in a session initiation request signaling message, an indication that the node supports maintenance of a shortcut media path; and for a subsequent session update or re-invite, determining, by the signaling node, from the contents of the session update or re-invite that the pre-existing shortcut media path is to be maintained.

13. An apparatus for managing a media path for a media session established between users across a plurality of interconnected Internet Protocol (IP) networks which utilize Session Initiation Protocol (SIP) and Session Description Protocol (SDP) signaling, comprising a processor and a memory, said memory containing instructions executable by said processor whereby said apparatus is operative to:

for a session initiation request traversing a signaling path across said IP networks, initiate an Optimal Media Routing (OMR) procedure and insert into the request an indication that the signaling node will subsequently be able to maintain any shortcut media path that deviates from a signaling path;

receive a session initiation request response including an indication that all nodes in the signaling path will subsequently be able to maintain any shortcut media path that deviates from a signaling path, wherein each node in the signaling path included, in a session initiation request signaling message, an indication that the node supports maintenance of a shortcut media path; and for a subsequent session update or re-invite, include within update or re-invite signaling an indication that the shortcut media path is to be maintained.

14. An apparatus for managing a media path for a media session established between users across a plurality of interconnected Internet Protocol (IP) networks which utilize Session Initiation Protocol (SIP) and Session Description Protocol (SDP) signaling, comprising a processor and a memory, said memory containing instructions executable by said processor whereby said apparatus is operative to:

for a session initiation request traversing a signaling path across said IP networks, terminate an Optimal Media Routing (OMR) procedure and determine from the contents of the session initiation request that downstream nodes in the signaling path will subsequently be able to maintain any shortcut media path that deviates from a signaling path, wherein each node in the signaling path included, in a session initiation request signaling message, an indication that the node supports maintenance of a shortcut media path; and for a subsequent session update or re-invite, include within update or re-invite signaling an indication that the shortcut media path is to be maintained.

15. An apparatus for managing a media path for a media session established between users across a plurality of interconnected Internet Protocol (IP) networks which utilize Session Initiation Protocol (SIP) and Session Description Protocol (SDP) signaling, comprising a processor and a memory, said memory containing instructions executable by said processor whereby said apparatus is operative to:

for a session initiation request traversing a signaling path across said IP networks, insert into the request an indication that the signaling node will subsequently be able to maintain any shortcut media path that deviates from a signaling path, wherein each node in the signaling path, included in a session initiation request signaling message, an indication that the node supports maintenance of a shortcut media path; and for a subsequent session update or re-invite, determine from the contents of the session update or re-invite that the pre-existing shortcut media path is to be maintained.

* * * * *